(12) United States Patent
Dunsmore et al.

(10) Patent No.: US 6,882,285 B2
(45) Date of Patent: Apr. 19, 2005

(54) PDA WATCH

(75) Inventors: Rodney Charles Dunsmore, Austin, TX (US); Steven Lee Harrington, Austin, TX (US); Mark Christian Speich, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 09/737,344

(22) Filed: Dec. 15, 2000

(65) Prior Publication Data

US 2003/0038729 A1 Feb. 27, 2003

(51) Int. Cl.[7] ............................................. G09F 13/00
(52) U.S. Cl. ................................. 340/815.53; 345/158
(58) Field of Search ..................... 340/815.53, 815.42, 340/825.44; 341/34, 35; 345/156, 158, 175

(56) References Cited

U.S. PATENT DOCUMENTS

| | | | | |
|---|---|---|---|---|
| 3,699,564 A | * | 10/1972 | Hodge, Jr. et al. .......... 340/317 |
| 3,948,209 A | * | 4/1976 | Takemoto et al. ..... 340/815.42 |
| 4,044,242 A | * | 8/1977 | Laesser ...................... 708/145 |
| 5,900,863 A | * | 5/1999 | Numazaki .................. 345/158 |
| 5,914,669 A | * | 6/1999 | Wicks et al. ........... 340/825.44 |
| 6,297,795 B1 | * | 10/2001 | Kato et al. .................. 345/123 |

OTHER PUBLICATIONS

"Terms of Use," TIMEX, available via the Internet at http://www.timex.com/html/legal.html, printed Sep. 26, 2000, Copyright 1997–2000 Timex.com, 5 pp.
"Pager Watch," TIMEX, available via the Internet at http://www.timex.com/html/data link.html, printed Sep. 26, 2000, Copyright 1997–2000 Timex.com, 2 pp.
"BZX207SCR PC Unite Watch w/Stainless Steel Band," CASIO, available via the Internet at http://www.casio.com/personalpcs/product.cfm?section=144&product–1840, printed Sep. 26, 2000, 1 p.

* cited by examiner

*Primary Examiner*—John Tweel
(74) *Attorney, Agent, or Firm*—Kelly K. Kordzik; Leslie Van Leeuwen

(57) ABSTRACT

A personal data assistant ("PDA") watch uses a "character wheel," or a "data dial," to enter information, or characters, into the PDA watch. Such a dial makes the entering of data much quicker by taking advantage of the flexibility of the human wrist. A dial containing the character set disbursed around its circumference can be turned to indicate which character the user wishes to enter. The selection of a particular symbol/character can then be made by depressing the dial or some other input button.

5 Claims, 5 Drawing Sheets

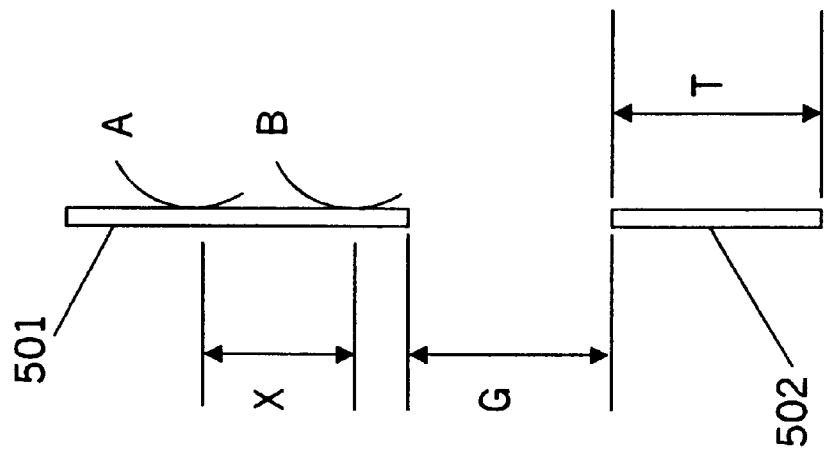
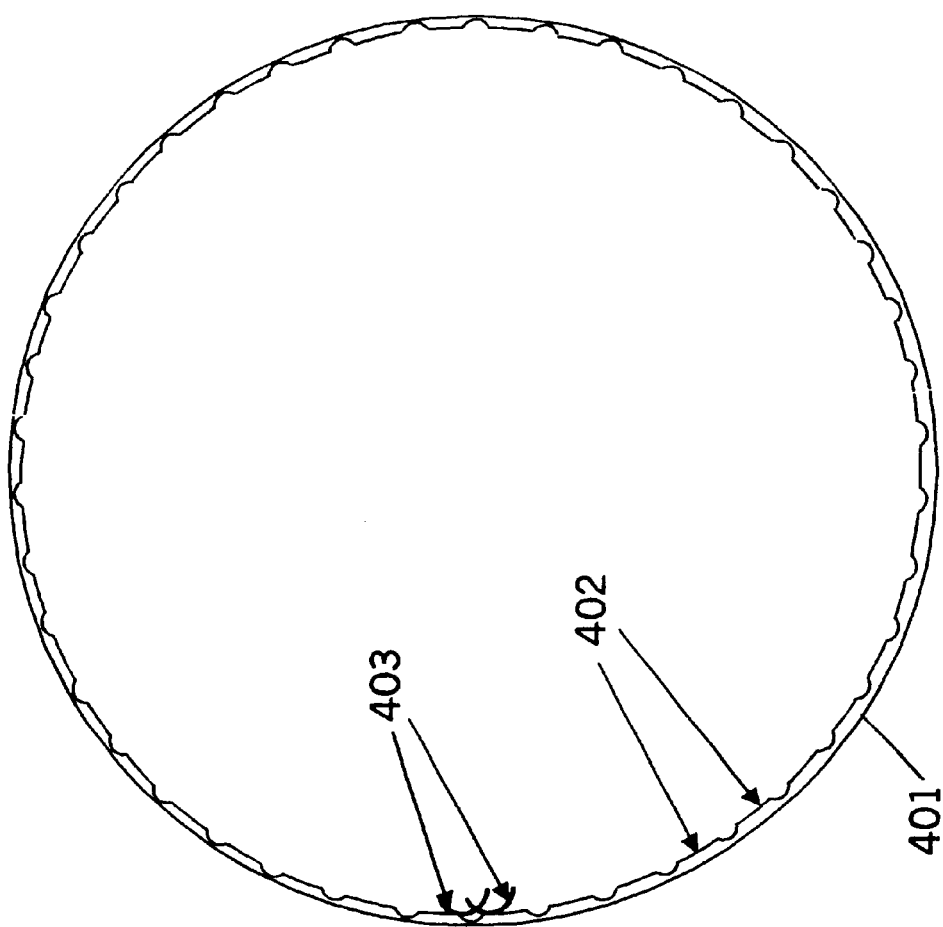

US 6,882,285 B2

PDA WATCH

TECHNICAL FIELD

The present invention relates in general to information processing apparatuses, and in particular to personal data assistants.

BACKGROUND INFORMATION

Personal Data Assistants (PDAs) are becoming increasingly popular, and several manifestations of the concept are currently on the market. One such manifestation (i.e., form factor) is the PDA watch, such as the Data Link manufactured by Timex and the BZX207SCR PC Unite watch manufactured by Casio. The advantage of PDA watches is that they are small, easily portable, and always available since they are attached to a person's wrist. The disadvantage is that entering information (i.e., data entry) is extremely difficult, so spontaneously entering data is tedious. Characters are generally entered by scrolling through the alphabet using the buttons on the side of the watch. If the supported character set is 36 characters (A–Z, 0–9), then the user may have to depress the button as many as 18 times to advance to the desired letter/number. Since, on average the user will have to press the button nine times per character, a fifteen character message will require 135 button presses. Another method for data entry into a PDA watch that has been utilized is to enter the data on a personal computer and then download it to the watch. This method is even more tedious than the former so that it is rarely used by owners of PDA watches. Additionally, the entering of information into the PDA watch requires that the user be near their personal computer, and thus remote entry of data is not possible.

As a result of the foregoing, there is a need in the art for an improved mechanism for data entry into a PDA watch.

SUMMARY OF THE INVENTION

The present invention addresses the foregoing problem by the use of a "character wheel," or "data dial," to enter information, or characters, into the PDA watch. Such a dial makes the entering of data much quicker by taking advantage of the flexibility of the human wrist. A dial containing the character set disbursed around its circumference can be turned to indicate which character the user wishes to enter. The selection of a particular symbol/character can then be made by depressing the dial or some other input button.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 illustrates an inner circumference of a dial lined radially with copper traces;

FIG. 5 illustrates further detail of such copper traces;

DETAILED DESCRIPTION

Figure 1:
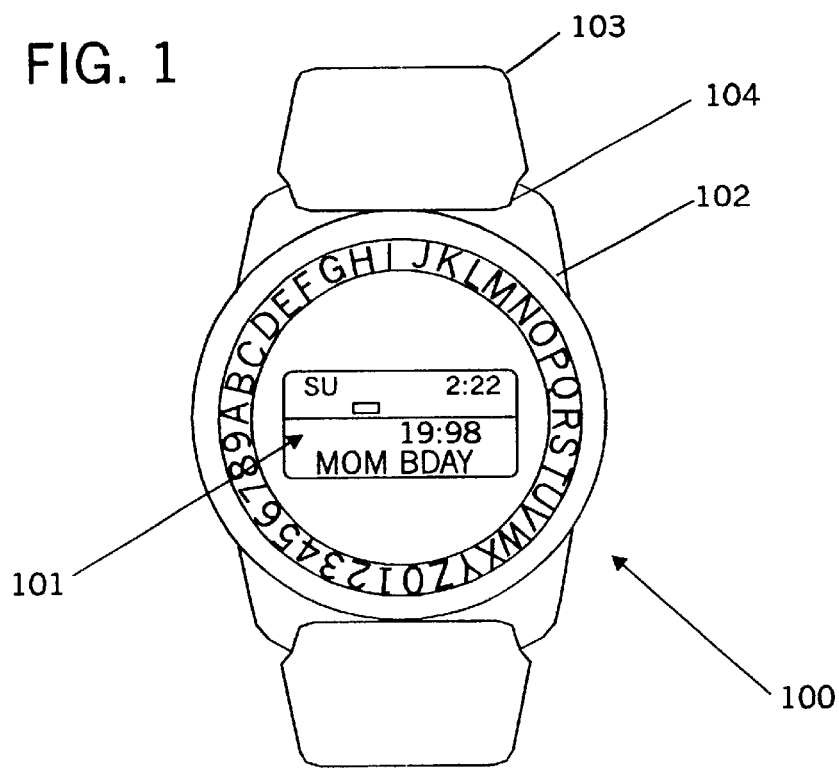
FIG. 1 illustrates a PDA watch configured in accordance with the present invention.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring to FIG. 1, there is illustrated a PDA watch 100 configured in accordance with the present invention. PDA watch 100 includes a display 101, which could be comprised of any well known LCD or equivalent display mechanism. Furthermore, PDA watch 100 includes a wrist band 103 for wearing a PDA watch 100 on a human wrist. Also illustrated is character wheel or data dial 102 for data entry into the PDA watch 100 in accordance with the present invention. Character data is entered into the PDA watch 100 using dial 102 of character data. The characters appear radially around the circumference of the dial 102. Dial 102 resides on the face of the watch 100, similar to time dials which appear on many scuba diving watches. As the dial 102 is turned, the character at the top 104 of the dial 102 is detected by the watch 100 and displayed at an appropriate place in whatever data the user is currently editing on the display 101. As an example, if the user wishes to enter in a person's name such as "Bob" into the PDA watch 100, the user will turn the dial 102 so that the "B" is at the top 104. Once the desired character is chosen, the user can press down on the dial 102 to enter the "B", and a cursor is then advanced on the display 101. Also, the "B" will be displayed, but not entered until the dial 102, or another button is depressed. The user can then enter the next character, which in this example would be the letter "O," and so on. Using this method, each character can be entered in less than one second. In contrast, selecting characters by pressing a button multiple times on the side of a PDA watch might take five seconds or more.

Figure 2:
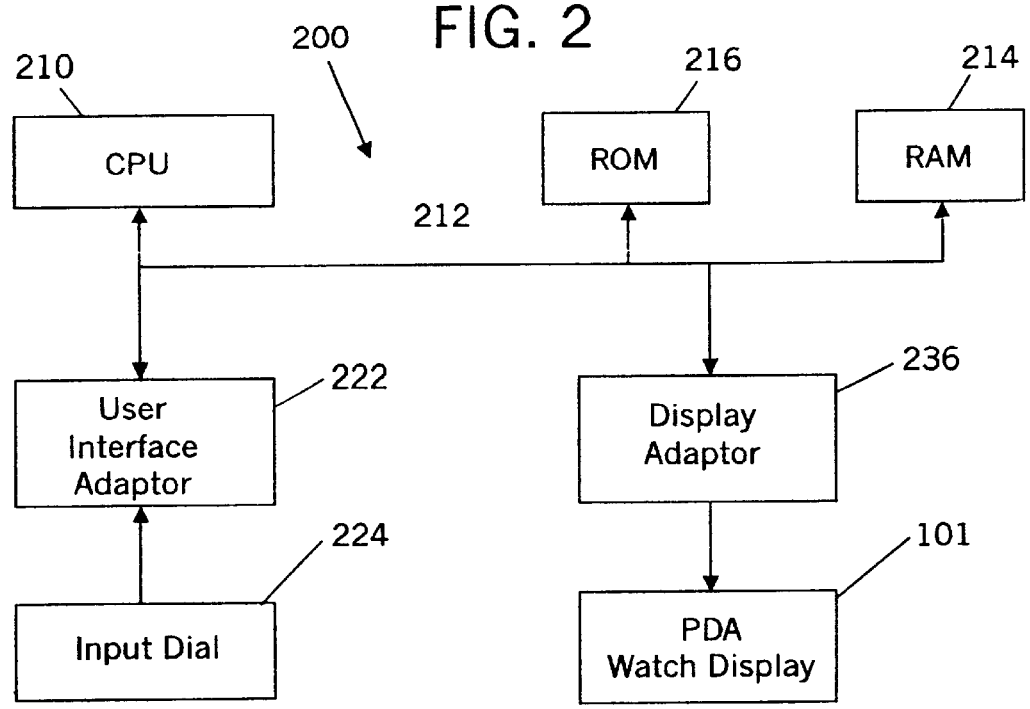
FIG. 2 illustrates a block diagram of circuitry implemented within the PDA watch in accordance with the present invention.
Figure 3:
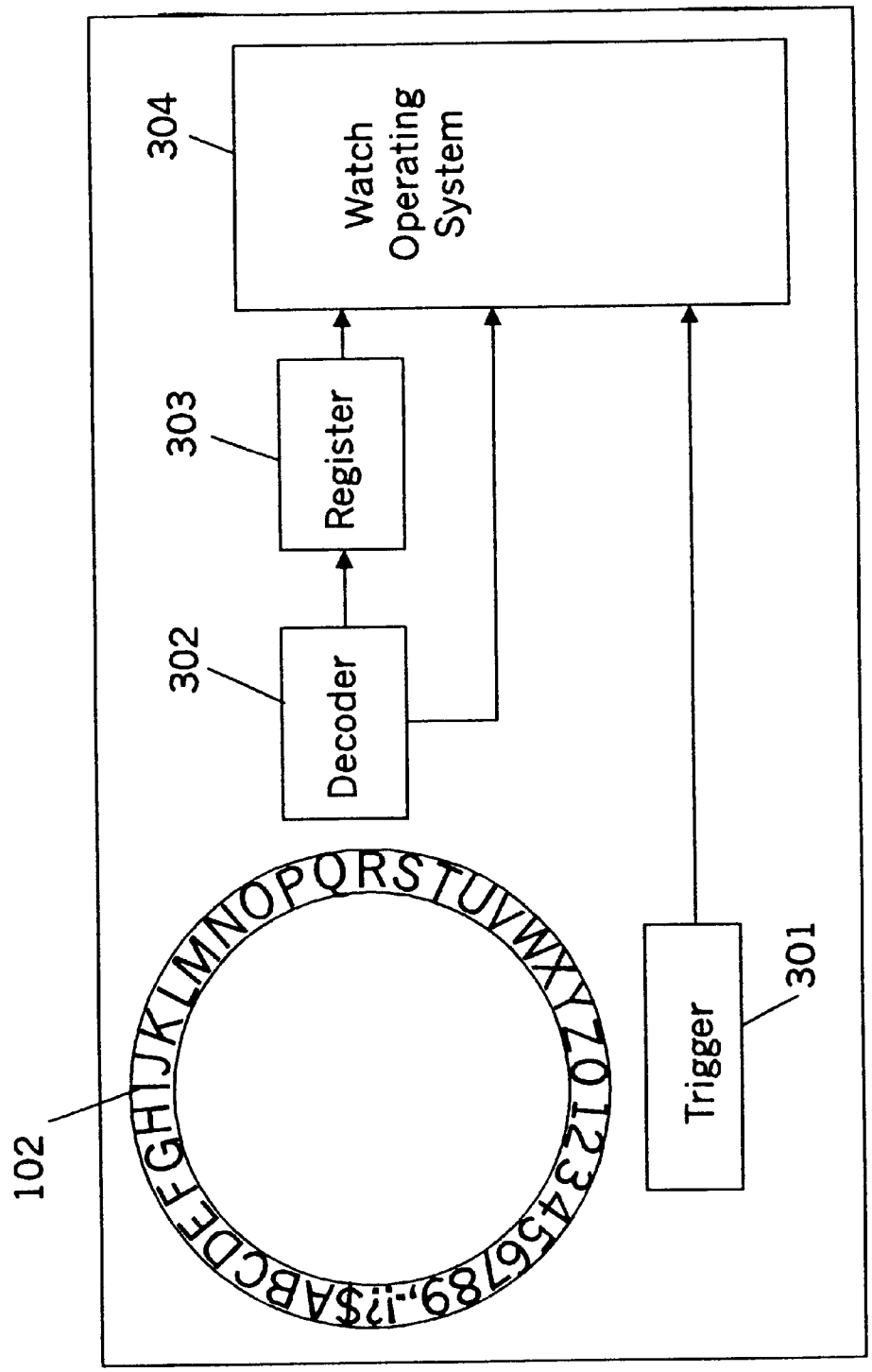
FIG. 3 illustrates an embodiment of the present invention.

Referring to FIG. 3, there is illustrated further detail on the mechanism for entering characters into the PDA watch 100. The watch dial 102 is rotated to a desired alphanumeric character or symbol, which would be indicated by some type of arrow or other pointing configuration 104 on the watch 100 to indicate to the user that the wheel is turned sufficiently to enter the desired character. With each incremental rotation, the decoder 302 determines the position of the dial 102 and updates the register 303 with the selected character or symbol. In other words, the decoder decodes the position of the dial and enters a binary code into register 303 representing the character to be inputted. Decoder 302 also notifies the watch operating system 304 running on the data processing system 200 described below with respect to FIG. 2 that a character is about to be made available for reading in the register 303.

The watch operating system 304 will wait a sufficient number of clock cycles to allow the register 303 to be loaded, then will read the available character from register 303. Once dial 102 is depressed (or some other button or crystal face is depressed on the watch 100), this will cause the trigger 301 to notify the watch operating system 304 that the user has selected the character in the register 303. The watch operating system 304 receives the interrupt and notifies the currently active application running within the PDA watch 100 of the selection. The application may respond to the notification in an appropriate manner. Such applications could be any one of a vast array of applications currently available for PDAs, and any other applications to be created in the future that can make use of input alphanumeric characters from a user.

The decoder of the present invention may utilize a quadrature system similar to that used in most computer mice. Referring to FIG. 4, the inner circumference of the dial 401 is lined radially with copper traces 402, which are separated by a distance G (see FIG. 5) and share a common electrical connection. This common connection is transmitted to the circuitry on the watch base via a brush type connection. Referring to FIG. 5, the copper traces 501, 502 on the dial are connected to the watch circuitry via two brush type connections A and B, which are offset by a distance X. The distance X must be less than the distances G and T. The following state diagram may be used to deduce watch position and direction of rotation:

| A | B | A | B | ΔChar |
|---|---|---|---|-------|
| 0 | 0 | 0 | 1 | +1    |
| 0 | 0 | 1 | 0 | −1    |

All state changes not listed are deemed irrelevant. The +1 indicates that the dial was advanced one character clockwise, while the −1 indicates that the dial was advanced one character counterclockwise. The decoder is aware of the number of characters to be represented by the dial, and it will reset itself to the first character if the dial is advanced past the last character and vice versa.

Figure 6:
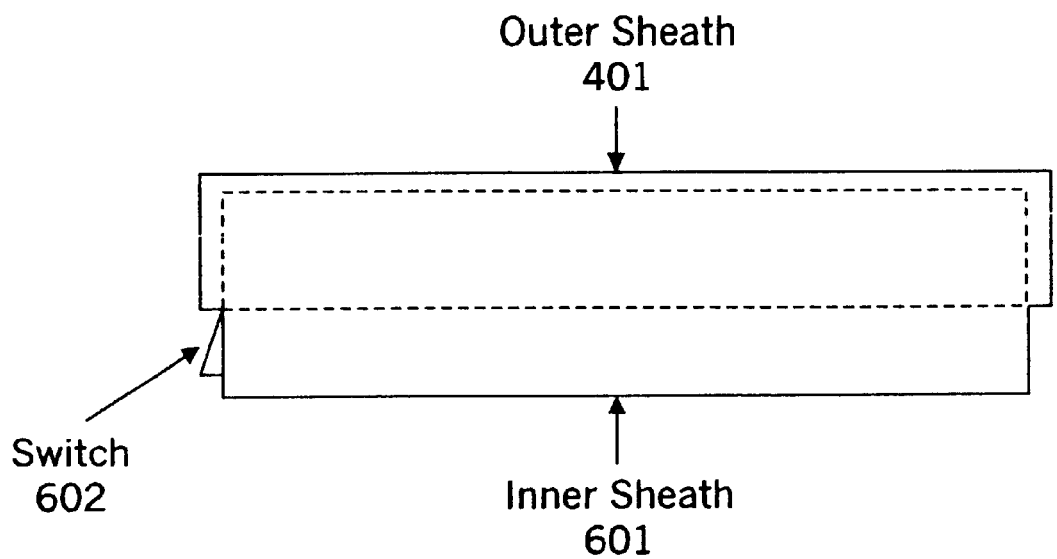
FIG. 6 illustrates an outer and inner sheath of the dial of the present invention.

Referring to FIG. 6, the dial is composed of two pieces. An outer sheath 401 whose inner circumference contains the aforementioned copper traces 402, and an inner sheath 601. The outer sheath is the component manipulated by the user. The outer sheath 401 can slide down the inner sheath 601, but is keyed so that any rotational force exerted on the outer sheath 401 is transferred to the inner sheath 601, and hence the copper traces 402. The outer sheath 401 is spring loaded, via a spring washer (not shown), so that it will spring back up to its original position after being depressed. A rocker switch 602 is used on the watch body to register a dial press, and notify the operating system that a character has been selected.

Figure 7:
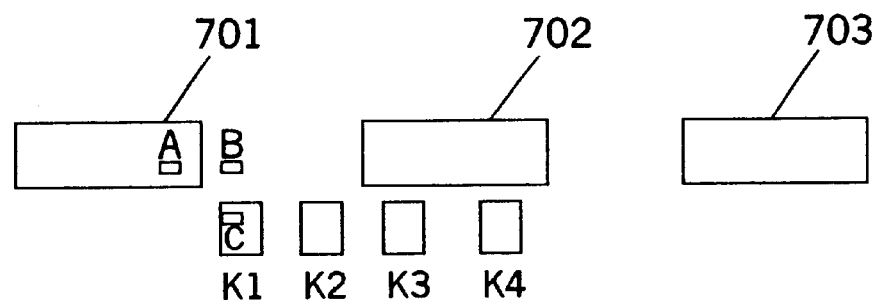
FIG. 7 illustrates an alternative embodiment of the present invention.

Due to wear and tear on the dial over time, it is possible for the above apparatus to occasionally fail to detect a low to high transition on one of the brushes A, B. This would result in the watch dial becoming permanently out of sync with the decoder. To rectify this problem, a further enhancement may be made to the electrical tracing system, which can be thought of as a general self synchronizing rotation detection mechanism. Referring to FIG. 7, an additional contact brush is added above or below the two brushes A and B on the original inner column. Also, four traces are added to the inner circumference of the inner sheath above or below the radial traces. These traces K1, K2, K3, K4 are separated by roughly ninety degrees each, and are used to determine the position of the dial when they make contact with the new contact brush C. Each trace is unique in its placement relative to the copper traces 701–703. FIG. 7 illustrates the copper traces laid out linearly, with the synchronization traces, or keys, appearing side by side. The brushes A, B and C are also displayed. The keys K1, K2, K3, or K4 share a common electrical connection with the radial traces. Whenever the electrical signal to brush C experiences a low to high transition, the states of brushes A and B are used to determine which key has been shorted with brush C using the following table:

| A | G | Key Found |
|---|---|-----------|
| 0 | 0 | K2        |
| 0 | 1 | K3        |
| 1 | 0 | K1        |
| 1 | 1 | K4        |

Within the decoder, the table will contain the actual binary representation of the characters above the keys. That is, each key will be under a character (i.e., "R"), and the decoder will place the binary representation of the character (i.e., 19) in the character register 303 when the key under the character makes contact with the brush C. This will allow for four synchronizations per revolution of the dial.

Figure 8:
FIG. 8 illustrates an exemplary inner circumference of a dial showing the placement of rotation and key traces.

FIG. 8 illustrates a diagram showing an exemplary inner circumference of a dial with 42 characters, with the placement of the rotation and key traces.

Referring to FIG. 2, an example is shown of a data processing system 200 which may be used for the invention. The system has a central processing unit (CPU) 210, which is coupled to various other components by system bus 212. Read only memory ("ROM") 216 is coupled to the system bus 212 and includes a basic input/output system ("BIOS") that controls certain basic functions of the data processing system 200. Random access memory ("RAM") 214 is also coupled to the system bus 212. The dial 224 is connected to system bus 212 via user interface adapter 222. Display 101 is connected to system bus 212 by display adapter 236.

Although the present invention and its advantages have been described in detail, it should be understood that various changes, substitutions and alterations can be made herein without departing from the spirit and scope of the invention as defined by the appended claims.

What is claimed is:

1. A PDA watch comprising:

a chassis;

data processing hardware mounted within the chassis and operable for running a software program;

a display device coupled to the data processing hardware for displaying output information from the software program, the display device mounted in the chassis so that the display device is viewable by a user of the PDA watch; and an input dial mounted on the chassis, and operable for inputting alphanumeric characters into the software program, wherein the input dial is circular shaped with depictions of the alphanumeric characters lining a circumference of the input dial, wherein an alphanumeric character is inputted into the software program when the depiction of the alphanumeric character is positioned near an input marker and then an input switch is activated, wherein the input dial comprises an outer sheath having an inner circumference greater than an outer circumference of the chassis, wherein the outer sheath fits over the chassis and is spring loaded to re-position the outer sheath relative to the chassis subsequent to a manual depressing of the out sheath, wherein the manual depressing of the outer sheath physically activates the input switch.

2. The PDA watch as recited in claim 1, wherein the chassis comprises first and second electrical brushes spaced a distance X apart, the first and second electrical brushes positioned on the outer circumference of the chassis to engage a first series of electrical contacts linearly positioned around the inner circumference of the outer sheath, the first series of electrical contacts spaced a distance G apart and each having a length T.

3. The PDA watch as recited in claim 2, wherein X is less than both of G and T.

4. The PDA watch as recited in claim 2, further comprising a third electrical brush positioned near the first and second electrical brushes on the outer circumference of the chassis to engage a second series of electrical contacts linearly positioned around the inner circumference of the outer sheath in parallel with the first series of electrical contacts.

5. The PDA watch as recited in claim 4, wherein the second series of electrical contacts are positioned approximately ninety degrees apart.

* * * * *